United States Patent
Guo

(10) Patent No.: US 12,192,253 B2
(45) Date of Patent: Jan. 7, 2025

(54) SESSION CREATION METHOD AND APPARATUS, AND ELECTRONIC DEVICE

(71) Applicant: VIVO MOBILE COMMUNICATION CO., LTD., Dongguan (CN)

(72) Inventor: Shanshan Guo, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 17/985,812

(22) Filed: Nov. 11, 2022

(65) Prior Publication Data

US 2023/0070190 A1   Mar. 9, 2023

Related U.S. Application Data

(63) Continuation of application No. PCT/CN2021/092540, filed on May 10, 2021.

(30) Foreign Application Priority Data

May 13, 2020   (CN) .......................... 202010403813.0

(51) Int. Cl.
*H04L 65/1104*   (2022.01)
*H04L 65/1093*   (2022.01)
(Continued)

(52) U.S. Cl.
CPC ...... *H04L 65/4015* (2013.01); *H04L 65/1093* (2013.01); *H04L 65/1104* (2022.05); *H04L 65/403* (2013.01); *H04M 3/564* (2013.01)

(58) Field of Classification Search
CPC ............. H04L 65/4015; H04L 65/1104; H04L 65/1093; H04L 65/403; H04L 65/564
See application file for complete search history.

(56) References Cited

U.S. PATENT DOCUMENTS 8,467,377 B2 * 6/2013 Kottilingal ............ H04W 76/15
370/336
9,008,293 B2 * 4/2015 Qiu ..................... H04M 3/2218
379/142.16

(Continued)

FOREIGN PATENT DOCUMENTS

CN   101087241 A   12/2007
CN   101296193 A   10/2008
(Continued)

OTHER PUBLICATIONS

International Search Report issued in corresponding International Application No. PCT/CN2021/092540, mailed Jul. 27, 2021, 4 pages.

(Continued)

*Primary Examiner* — Dhairya A Patel
(74) *Attorney, Agent, or Firm* — IPX PLLC

(57) ABSTRACT

A session creation method and an apparatus are provided. The method includes: sending, in a case that a first Session Initiation Protocol (SIP) session has been created among a first electronic device and N second electronic devices, a first REFER request to a third electronic device. The first REFER request is used for requesting to create a second SIP session with the third electronic device, and the third electronic device is at least one of the N second electronic devices. The method includes receiving a first response message fed back by the third electronic device in response to the first REFER request and creating the second SIP session in a case that the first response message indicates that the third electronic device agrees to create second SIP session. N is a positive integer.

15 Claims, 6 Drawing Sheets

(51) Int. Cl.
*H04L 65/401* (2022.01)
*H04L 65/403* (2022.01)
*H04M 3/56* (2006.01)

(56) References Cited

U.S. PATENT DOCUMENTS

| | | | |
|---|---|---|---|
| 9,401,834 B1* | 7/2016 | Jamshidi | H04L 65/1104 |
| 2007/0076660 A1* | 4/2007 | Sung | H04L 65/4038 |
| | | | 370/352 |
| 2007/0091830 A1 | 4/2007 | Coulas et al. | |
| 2008/0009303 A1 | 1/2008 | Westman et al. | |
| 2011/0228761 A1* | 9/2011 | Miyata | H04L 61/4535 |
| | | | 370/352 |
| 2012/0128146 A1 | 5/2012 | Boss | |
| 2012/0166652 A1* | 6/2012 | Bouthemy | H04L 65/4053 |
| | | | 709/227 |
| 2012/0260310 A1* | 10/2012 | Kramarenko | H04L 67/143 |
| | | | 709/227 |
| 2013/0163590 A1* | 6/2013 | Bouvet | H04L 65/102 |
| | | | 370/352 |
| 2014/0068710 A1* | 3/2014 | Lau | H04L 61/5007 |
| | | | 370/352 |
| 2014/0214972 A1* | 7/2014 | Nemani | H04L 65/1045 |
| | | | 709/206 |
| 2014/0373101 A1* | 12/2014 | Mani | H04L 9/3213 |
| | | | 726/4 |
| 2015/0195862 A1* | 7/2015 | Naqvi | H04W 48/18 |
| | | | 370/255 |
| 2015/0237144 A1* | 8/2015 | Miao | H04L 67/14 |
| | | | 709/228 |
| 2018/0183933 A1* | 6/2018 | Singh | H04W 4/16 |
| 2019/0387030 A1* | 12/2019 | Sridhar | H04L 65/1069 |

FOREIGN PATENT DOCUMENTS

| | | | |
|---|---|---|---|
| CN | 101325581 A | 12/2008 | |
| CN | 101626300 A | 1/2010 | |
| CN | 104506523 A | 4/2015 | |
| CN | 107070849 A | 8/2017 | |
| CN | 108418836 A | 8/2018 | |
| CN | 109150856 A | 1/2019 | |
| CN | 111641602 A | 9/2020 | |
| EP | 2154844 A1 | 2/2010 | |
| JP | 2013005031 A | 1/2013 | |
| WO | WO-2007040931 A1 * | 4/2007 | ......... H04L 12/1813 |
| WO | 2007112640 A1 | 10/2007 | |
| WO | 2010024630 A2 | 3/2010 | |

OTHER PUBLICATIONS

First Office Action issued in related Chinese Application No. 202010403813.0, mailed Jan. 5, 2022, 8 pages.
Second Office Action issued in related Chinese Application No. 202010403813.0, mailed Jun. 21, 2022, 7 pages.
Extended European Search Report issued in related European Application No. 21804814.8, mailed Aug. 8, 2023, 7 pages.
Notice of Reason of Refusal issued in related Japanese Application No. 2022-563108, mailed Dec. 5, 2023, 7 pages.
Examination Report issued in related Indian Application No. 202217069403, mailed Jan. 9, 2024, 6 pages.

* cited by examiner

SESSION CREATION METHOD AND APPARATUS, AND ELECTRONIC DEVICE

CROSS-REFERENCE TO RELATED APPLICATIONS

This application is a continuation of International Application No. PCT/CN2021/092540, filed on May 10, 2021, which claims the priority of Chinese Patent Application No. 202010403813.0 filed on May 13, 2020, the entire content of which is hereby incorporated by reference. The entire contents of each of the above-referenced applications are expressly incorporated herein by reference.

TECHNICAL FIELD

Embodiments of this application relate to the field of communication technologies, and in particular, to a session creation method and apparatus, and an electronic device.

BACKGROUND

With the popularity of telecommuting, telecommuting software is currently installed on most electronic devices. In this way, a teleconference (such as a voice call or a video call) can be created among electronic devices through the telecommuting software, so as to realize cross-regional information interaction among a plurality of electronic devices in different regions. Generally, most types of telecommuting software create a teleconference based on a Session Initiation Protocol (SIP).

In the related art, when creating a session based on the SIP, a first electronic device sends an INVITE request to a second electronic device, to request to jointly create a SIP session with the second electronic device. In this way, after the INVITE request is received, if the second electronic device accepts the INVITE request, the SIP session between the second electronic device and the first electronic device is created. Then, another electronic device can participate in the session in a manner of sending an INVITE request to a session initiator, a session participant, or a background server.

However, an INVITE request can only be used for session updating after a session is successfully created. Therefore, after the session is successfully created, if a participant of the session intends to create a new session with another participant in a process of participating in the session, the participant needs to exit the session and recreate the new session. In this way, the problem that a new session cannot be created before an original session between electronic devices ends is caused.

SUMMARY

Embodiments of this application provide a session creation method and apparatus, and an electronic device.

This application is implemented as follows:

In a first aspect, an embodiment of this application provides a session creation method, including: sending, in a case that a first SIP session has been created among a first electronic device and N second electronic devices, a first reference REFER request to a third electronic device, where the first REFER request is used for requesting to create a second SIP session with the third electronic device, and the third electronic device is at least one of the N second electronic devices; receiving a first response message fed back by the third electronic device in response to the first REFER request; and creating the second SIP session in a case that the first response message indicates that the third electronic device agrees to create second SIP session, where N is a positive integer.

In a second aspect, an embodiment of this application provides another session creation method, including: receiving, in a case that a first session initiation protocol SIP session has been created among a first electronic device and N second electronic devices, a first reference REFER request from the first electronic device, where the first REFER request is used for requesting to create a second SIP session between the first electronic device and a third electronic device; and sending a first response message to the first electronic device in response to the first REFER request, where the first response message is used for indicating whether the third electronic device agrees to create the second SIP session, where the third electronic device is at least one of the N second electronic devices, and N is a positive integer.

In a third aspect, an embodiment of this application further provides a session creation apparatus, where the apparatus includes a sending module, a receiving module, and a creation module; the sending module is configured to send, in a case that a first session initiation protocol SIP session has been created among the first electronic device and N second electronic devices, a first reference REFER request to a third electronic device, where the first REFER request is used for requesting to create a second SIP session with the third electronic device, and the third electronic device is at least one of the N second electronic devices; the receiving module is configured to receive a first response message fed back by the third electronic device in response to the first REFER request sent by the sending module; and the creation module is configured to create the second SIP session in a case that the first response message received by the receiving module indicates that the third electronic device agrees to create the second SIP session, where N is a positive integer.

In a fourth aspect, an embodiment of this application further provides another session creation apparatus, where the apparatus includes a receiving module and a sending module; the receiving module is configured to receive, in a case that a first session initiation protocol SIP session has been created among a first electronic device and N second electronic devices, a first reference REFER request from the first electronic device, where the first REFER request is used for requesting to create a second SIP session between the first electronic device and third electronic device; and the sending module is configured to send a first response message to the first electronic device in response to the first REFER request received by the receiving module, where the first response message is used for indicating whether the third electronic device agrees to create the second SIP session, where the third electronic device is at least one of the N second electronic devices, and N is a positive integer.

In a fifth aspect, an embodiment of this application further provides an electronic device, including a processor, a memory, and a program or instruction stored in the memory and executable on the processor, the program or instruction, when executed by the processor, implementing steps of the session creation method provided in the first aspect.

In a sixth aspect, an embodiment of this application further provides a readable storage medium, storing a program or instruction, the program or instruction, when executed by a processor, implementing steps of the session creation method provided in the first aspect.

In a seventh aspect, an embodiment of this application further provides a chip, including: a processor and a communication interface, where the communication interface is coupled to the processor, and the processor is configured to run a program or instruction, to implement the method provided in the first aspect.

In the embodiments of this application, in a case that a first SIP session exists between a first electronic device and a second electronic device, the first electronic device integrates a session creation function in a REFER request, so that the first electronic device can send a first REFER request to a third electronic device, to create a second SIP session between the first electronic device and the third electronic device, so that a session participant in the first SIP session can create, in a process of participating in the first SIP session, the second SIP session among session participants in the first SIP session through the REFER request. In this way, under a condition that the first SIP session between the first electronic device and the second electronic device is not disconnected, the second SIP session is created, so that users can perform group sessions on a basis of a multi-person session.

DETAILED DESCRIPTION

The following describes the technical solutions in the embodiments of this application with reference to the accompanying drawings in the embodiments of this application. Apparently, the described embodiments are some embodiments of this application rather than all of the embodiments. All other embodiments obtained by a person of ordinary skill in the art based on the embodiments of this application without creative efforts shall fall within the protection scope of this application.

The specification and claims of this application, and terms "first" and "second" are used to distinguish similar objects, but are unnecessarily used to describe a specific sequence or order. It should be understood that the data in such a way are interchangeable in proper circumstances, so that the embodiments of this application can be implemented in other orders than the order illustrated or described herein. In addition, in the specification and the claims, "and/or" means at least one of the connected objects, and the character "/" generally indicates an "or" relationship between the associated objects.

For ease of understanding, part terms related in the embodiments of the present application and the related art are described:

A SIP is a signaling control protocol at an application layer, and is used for creating, modifying, and releasing sessions of one or more participants. The sessions may be Internet multimedia conferences, Internet Protocol (IP) telephony, or multimedia distribution. The participants of the sessions can communicate through multicast, unicast, or a mixture of the two. A session is created among a plurality of electronic devices by an application program based on the SIP.

Figure 1:
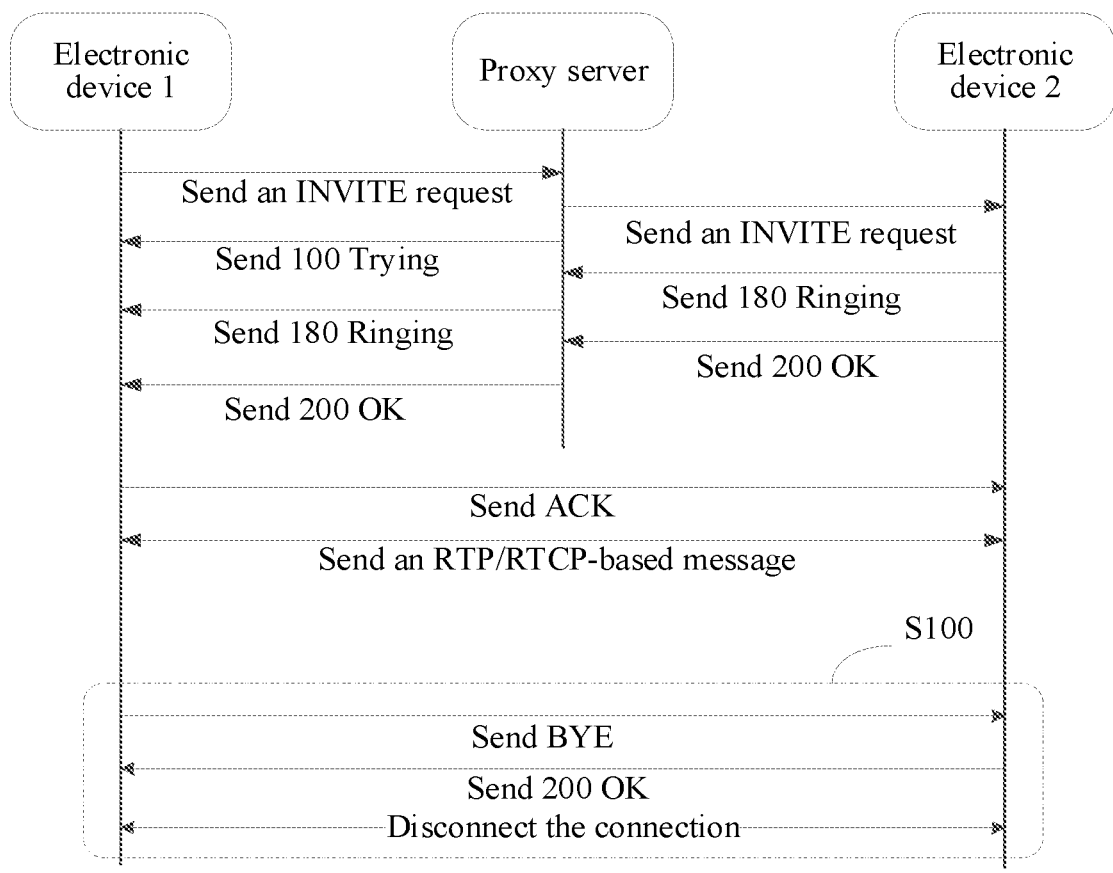
FIG. 1 is a schematic flowchart of creating a SIP session according to an embodiment of this application.

FIG. 1 is a simplified flowchart of creating a SIP-based session between two electronic devices. When an electronic device 1 intends to create a SIP-based session with an electronic device 2, the electronic device 1 sends an INVITE request to a proxy server, where the request includes a Uniform Resource Identifier (URI) of a user represented by the electronic device 2. After the INVITE request sent by the electronic device 1 is received, the proxy server parses a real network address of the electronic device 2 according to the URI carried in the INVITE request, and forwards the INVITE request sent by the electronic device 1 to the electronic device 2. While forwarding the INVITE request sent by the electronic device 1, the proxy server also sends a 100 Trying message to the electronic device 1, to prevent the electronic device 1 from repeatedly sending the INVITE request. After the INVITE request forwarded by the proxy server is received, the electronic device 2 also sends a 180 Ringing message to the proxy server while ringing to remind a user. After the 180 Ringing message sent by the electronic device 2 is received, the proxy server forwards the message to the electronic device 1. After the user hears the ringing reminder of the electronic device 2, the session is connected. In this case, the electronic device 2 sends a 200 confirmation OK message to the proxy server, to inform the proxy server that the electronic device 2 has connected the session. After the 200 OK message sent by the electronic device 2 is received, the proxy server forwards the message to the electronic device 1, and then the electronic device 1 directly sends an Acknowledge character (ACK) message to the electronic device 2. In this case, both the electronic device 1 and the electronic device 2 obtain a real network address of an object. Therefore, the two parties can communicate directly without the proxy server. After the electronic device 2 receives the ACK message sent by the electronic device 1, the session is successfully created, and data packets based on a Real-time Transport Protocol (RTP) and a Real-time Transport Control Protocol (RTCP) can be sent between the electronic device 1 and the electronic device 2.

After a session 1 is created between the electronic device 1 and the electronic device 2, another electronic device (such as an electronic device 3) can participate in the session 1 in the following five manners.

Manner 1. The electronic device 3 may obtain a URI of the session 1 through an E-mail, a Web announcement, an instant message, or the like, and then sends an INVITE message to the session 1 to request to participate in the session 1. A session 1 control center determines whether to agree the electronic device 3 to participate in the session 1 after receiving the INVITE message. Different from the URI of the user represented by the electronic device, the URI of the session 1 is used for representing the session 1 created between the electronic device 1 and the electronic device 2. Manner 1 is also referred to as a Call-In manner.

Manner 2. A session 1 control center of the session 1 actively sends an INVITE message to the electronic device 3, where the INVTIE message is used for inviting the electronic device 3 to participate in the session 1. Because the connection among participants of the SIP-based session 1 is created through a URI, the session 1 control center needs to obtain a URI of a user represented by the electronic device 3. Usually, the session 1 control center stores the URI. Manner 2 is also referred to as a Call-Out manner.

Manner 3. The electronic device 3 sends a REFER request to a session 1 control center, to trigger the session 1 control center to invite the electronic device 3 to participate in the session 1. The REFER request needs to carry a URI of the session 1.

Manner 4. The electronic device 3 sends a REFER request to a participant of the session 1, to trigger the participant of the session 1 receiving the REFER request to invite the electronic device 3 to participate in the session 1. The REFER request needs to carry a URI of the participant of the session 1.

Manner 5. The electronic device 3 sends an INVITE request carrying a JOIN header field to a participant of the session 1, to participate in the session 1. The INVITE request needs to carry a URI of the participant of the session 1.

After the session 1 is successfully created between the electronic device 1 and the electronic device 2, if the electronic device 1 needs to disconnect the session 1 with the electronic device 2, as shown in S100 in FIG. 1, the electronic device 1 may directly send a bye BYE message to the electronic device 2, to disconnect the session 1 with electronic device 2. After the BYE message sent by the electronic device 1 is received, the electronic device 2 sends a 200 OK message to the electronic device 1, and disconnects the session 1 created with the electronic device 1.

It should be noted that, an INVITE request in the SIP is used for creating a session between electronic devices. After an electronic device that initiates session creation receives an ACK message reply from an opposite end, it is considered that the session between the electronic devices is successfully created. If an INVITE request is sent between electronic devices between which a session have been successfully created, a session with information cannot be created. The INVITE request sent between the electronic devices between which the session have been successfully created is referred to as a RE-INVITE request, and the RE-INVITE request is used for changing a session characteristic or refreshing a dialog state (for example, adding a new user to the session).

The session creation method provided in the embodiments of this application can be applied to a scenario of a multi-person conference.

Exemplarily, a scenario is provided: in a multi-person teleconference, in a case that a multi-person teleconference has existed, group discussions in groups need to be conducted, and discussion content of a group is not intended to be known by other conference members outside the group. In the related art, on a basis that a session has been created, an INVITE request used for creating a SIP session between electronic devices can only be used for inviting other users to participate in the session or updating current session information, but cannot be used for creating a new session. Therefore, when a user intends to have a group discussion, group members need to disconnect the existing session, and a new session needs to be created among the group members participating in the group discussion.

For this problem, in the technical solutions provided in the embodiments of this application, a characteristic that a REFER message in the SIP can carry customized information can be used. In a case that a SIP session is created between an electronic device 1 and an electronic device 2, the electronic device 1 may send a REFER request to the electronic device 2. After the REFER request is received, the electronic device 2 creates a SIP session with the electronic device 1. Different from an original function of the REFER request, the above first REFER request may be used for requesting to create the SIP session between the electronic device 1 and the electronic device 2. Then, the electronic device 1 and the electronic device 2 may add other users to the SIP session in the above five manners. In this way, it is convenient for users to conduct group discussions in groups during a multi-person conference.

A session creation method provided in the embodiments of this application is described below through embodiments and application scenarios thereof with reference to the accompanying drawings.

Figure 2:
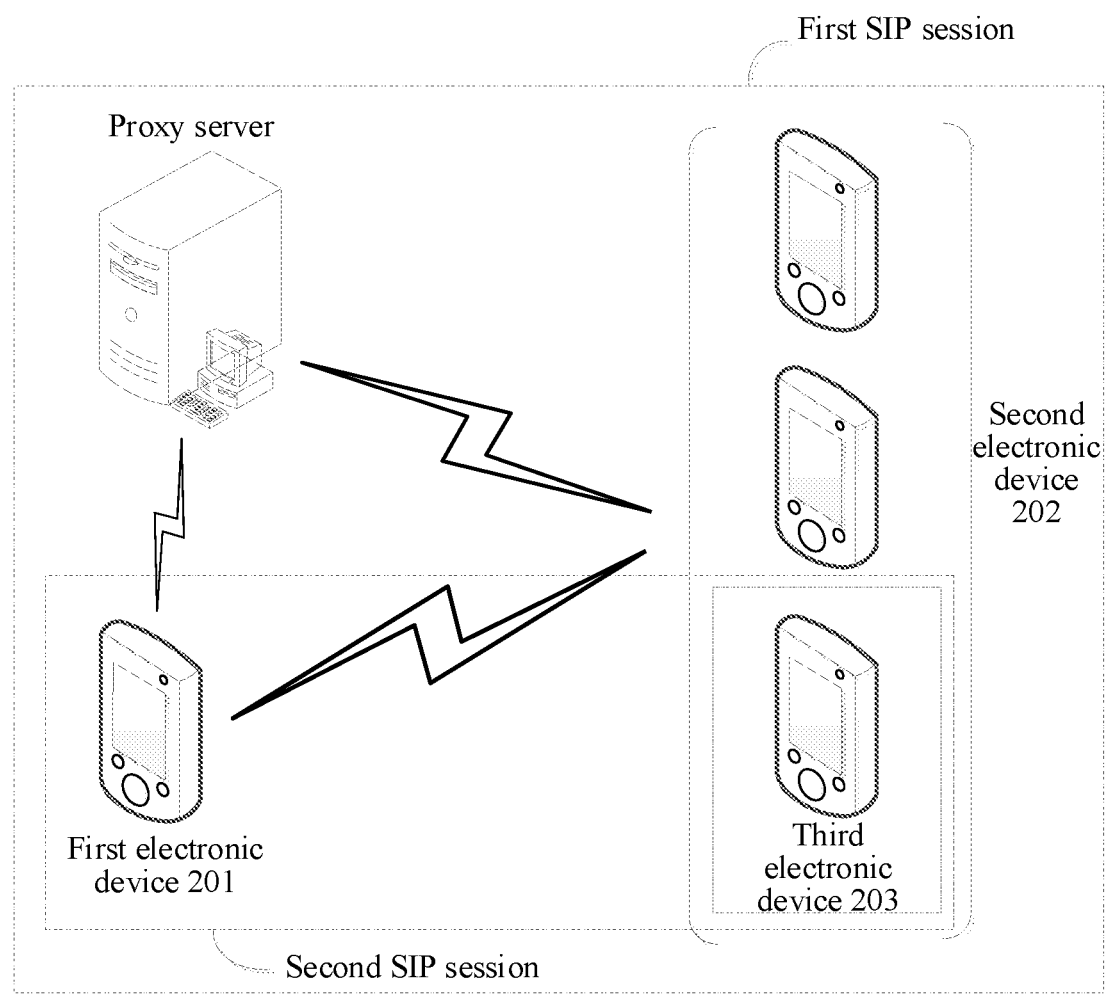
FIG. 2 is a schematic structural diagram of a session control system according to an embodiment of this application.

As shown in FIG. 2, an embodiment of this application provides a session control system. The session control system includes a first electronic device 201, a second electronic device 202, and a third electronic device 203, where: the first electronic device 201 may perform information interaction with the second electronic device 202 (the third electronic device 203) through a proxy server, or data interaction may be directly performed after each one of two parties obtain a real network address of the other of the two parties.

In a case that a first session initiation protocol SIP session has been created among the first electronic device 201 and N second electronic devices 202, the first electronic device 201 sends a first REFER request to the third electronic device 203, where the first REFER request is used for requesting to create a second SIP session with the third electronic device 203, the third electronic device 203 is at least one of the N second electronic devices 202, and N is a positive integer.

After the third electronic device 203 receives the first REFER request from the first electronic device 201, the third electronic device 203 sends a first response message to the first electronic device 201. The first REFER request is used for requesting to create the second SIP session between the first electronic device 201 and the third electronic device 203.

The first response message is used for indicating whether the third electronic device 203 agrees to create the second SIP session between the first electronic device 201 and the third electronic device 203.

After the first electronic device 201 receives the first response message fed back by the third electronic device 203 in response to the first REFER request, if the first response message indicates that the third electronic device 203 agrees to create the second SIP session, the first electronic device 201 creates the second SIP session.

In this way, in a case that a first SIP session exists between a first electronic device and a second electronic device, the first electronic device request, to create a second SIP session with the second electronic device in a manner of sending a first REFER request to the second electronic device, and creates the second SIP session with the second electronic device after receiving a first response message sent by the second electronic device. The first electronic device may create a new teleconference with the second electronic device on a basis that the first electronic device has created a teleconference with the second electronic device.

In some embodiments, to distinguish the first REFER request from a traditional REFER message, before the first electronic device 201 sends the first REFER request to the third electronic device 203, the first electronic device 201 generates the first REFER request according to a target REFER parameter, where the target REFER parameter includes a URI of the third electronic device 203 and first information, and the first information is used for instructing the third electronic device 203 to create the second SIP session. The third electronic device 203 parses the first REFER request, to obtain the target REFER parameter carried in the first REFER request. The third electronic device 203 determines whether to create the second SIP session with the first electronic device 201 according to the target REFER parameter.

In this way, the first electronic device 201 can send the REFER request carrying the first information to the third electronic device 203, to request to create the second SIP session with the third electronic device 203.

In some embodiments, to ensure that the first SIP session between the first electronic device 201 and the third electronic device 203 can be restored while the second SIP session between the first electronic device 201 and the third electronic device 203 is disconnected, the first electronic device 201 sends a second REFER request to the third electronic device 203, and disconnects the second SIP session, where the second REFER request carries second information, and the second information is used for instructing the third electronic device 203 to disconnect the second SIP session with the first electronic device 201. The third electronic device 203 receives the second REFER request from the first electronic device 201. The third electronic device 203 parses the second REFER request, and disconnects the second SIP session according to the second information carried in the second REFER request.

In this way, the first electronic device 201 can send the REFER request carrying the second information to the third electronic device 203, to request to disconnect the second SIP session with the third electronic device 203.

In some embodiments, before the first electronic device 201 creates the second SIP session with the third electronic device 203, the first SIP session may be created between the first electronic device 201 and the second electronic device 202 in a manner of sending an INVITE request. The first electronic device 201 sends an invitation INVITE request to a target second electronic device 202, where the INVITE request is used for requesting to create the first SIP session with the target second electronic device 202. The first electronic device 201 receives a second response message fed back by the third electronic device 203 in response to the INVITE request. If the second response message indicates that the target second electronic device 202 agrees to create the first SIP session, the first electronic device 201 creates the first SIP session, where the target second electronic device 202 is at least one of the N second electronic devices 202.

In this way, the first electronic device 201 creates the first SIP session with the second electronic device 202 in a manner of sending the INVITE request to the second electronic device 202.

It should be noted that, the created first SIP session has existed among the above first electronic device 201 and N second electronic devices 202, and the third electronic device 203 is at least one of the N second electronic devices 202. When the first electronic device 201 intends to create the second SIP session with the third electronic device 203, a user of the first electronic device 201 needs to select, on an interface of the first SIP session, an identifier of the third electronic device 203 from identifiers of the above N second electronic devices 202, so as to create the second SIP session with the third electronic device 203.

Figure 3:
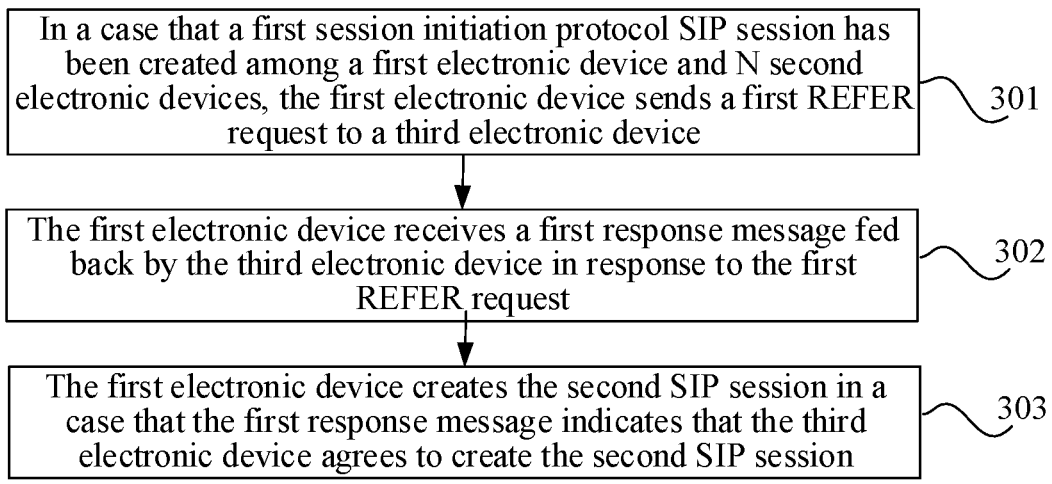
FIG. 3 is a first schematic flowchart of a session creation method according to an embodiment of this application.

This embodiment provides a session creation method. As shown in FIG. 3, this embodiment mainly targets a first electronic device side, and the session creation method includes the following step 301 to step 303.

Step 301. In a case that a first session initiation protocol SIP session has been created among a first electronic device and N second electronic devices, the first electronic device sends a first REFER request to a third electronic device.

The first REFER request is used for requesting to create a second SIP session between the first electronic device and the third electronic device, and N is a positive integer.

Exemplarily, the first electronic device and the third electronic device are electronic devices in the first SIP session that intend to create a SIP session on a basis of the first SIP session.

Exemplarily, a user of the first electronic device may click an identifier of a user to which the third electronic device belongs on an interface of the first SIP session, to trigger the first electronic device to send the above first REFER request to the third electronic device.

For example, in this embodiment of this application, different from the REFER requests sent by other electronic devices when participating in the SIP session in the above manner 3 and manner 4, to ensure that the REFER request can be used for requesting to create the SIP session between the first electronic device and the third electronic device, the above first REFER request may include specific information. In this way, after the first REFER request sent by the first electronic device is received, the third electronic device can create the SIP session with the first electronic device according to the request.

Exemplarily, before step 301, the session creation method provided in this embodiment of this application may further include the following step 301a.

Step 301a. The first electronic device generates the first REFER request according to a target REFER parameter.

The target REFER parameter includes a URI of the third electronic device and first information, and the first information is used for instructing the third electronic device to create the second SIP session.

Exemplarily, based on a session created by the SIP, a participant of the session obtains a real network address of another party through URIs of participants, and send information to the other party. Therefore, to accurately send the first REFER request to the third electronic device, the first electronic device may map the URI of the third electronic device to a Refer-To header field of the first REFER request. For example, a value of the Refer-To header field of the first REFER request may be a whatever URI, which represents that the first REFER request may be sent to any participant of the first SIP session. Further, by using the user to which the third electronic device belongs being Bob as an example, the value of the Refer-To header field of the first REFER request may be the URI of the third electronic device, such as, Refer-To:<sip:Bob@Bob.example>.

Exemplarily, to ensure that the third electronic device can correctly determine the intention of the first electronic device after receiving the first REFER request, the first REFER request further carries the first information. Different from the REFER requests in the above manner 3 and manner 4, the first information is used for instructing the third electronic device to create the second SIP session. Further, the first information may be in the Refer-To header field of the first REFER request, such as, Refer-To:<sip:Bob@Bob.example;method=invite>, where the value method=invite in the Refer-To header field represents that the first REFER request is used for instructing the third electronic device to create the second SIP session with the first electronic device.

In this way, the first electronic device can send the first REFER request including the target parameter to the third electronic device according to the URI of the third electronic device. After the first REFER request is received, the third electronic device can determine that the first electronic device intends to create the SIP session with the third electronic device according to the first information in the Refer-To header field of the first REFER request. Then, the third electronic device can create the second SIP session with the first electronic device according to the first information.

Step 302. The first electronic device receives a first response message fed back by the third electronic device in response to the first REFER request.

Step 303. The first electronic device creates the second SIP session in a case that the first response message indicates that the third electronic device agrees to create the second SIP session.

Exemplarily, after the response of agreeing to create the second SIP session sent by the third electronic device is received, the first electronic device creates the second SIP session with the third electronic device. After the new SIP session is created between the first electronic device and the third electronic device, the first SIP session is not disconnected. That is, the first SIP session and the new created SIP session simultaneously exist between the first electronic device and the third electronic device.

Exemplarily, after the second SIP session is successfully created, for a manner of inviting other users to participate in the session, reference may be made to the above manner 1 to manner 5. In the above manner 1 to manner 5, the manner in which other users participate in the session is described in detail. To avoid repetition, details are not described herein again.

In this way, in a case that a first SIP session exists between a first electronic device and a second electronic device, the first electronic device integrates a session creation function in a REFER request, so that the first electronic device can send a first REFER request to a third electronic device, to create a second SIP session between the first electronic device and the third electronic device, so that a session participant in the first SIP session can create, in a process of participating in the first SIP session, the second SIP session among session participants in the first SIP session through the REFER request. In this way, under a condition that the first SIP session between the first electronic device and the second electronic device is not disconnected, the second SIP session is created, so that users can perform group sessions on a basis of a multi-person session.

For example, in this embodiment of this application, after the second SIP session is successfully created between the first electronic device and the third electronic device, to prevent a user from being disturbed by voice in the first SIP session and prevent other users in the first SIP session from being disturbed, audio transmission directions and volumes between the first SIP session and the second SIP session in the first electronic device and the third electronic device may be controlled.

Exemplarily, by using the first electronic device as an example, audio control of the first SIP session and the second SIP session in the first electronic device may be controlled by at least two of the following control methods:

Control Method 1:

In manner 1, the first electronic device controls an input of an audio according to a current SIP session interface activated by the user.

Exemplarily, after step 303, the session creation method provided in this embodiment of this application may further include the following step 303a1 and step 303a2.

Step 303a1. The first electronic device acquires a voice signal of the user in a case that a session interface of a target SIP session is in an activated state.

Step 303a2. The first electronic device inputs the voice signal into the target SIP session.

The target SIP session includes the first SIP session or the second SIP session.

Exemplarily, when a session interface of the first SIP session is in the activated state (that is, a dialog box of the first SIP session is a current active dialog box of the electronic device, and under normal circumstances, an operating system only allows one dialog box to be in the activated state) and a session interface of the second SIP session is in an inactivated state, the first electronic device controls to input the audio of the user into the first SIP session, and disconnects an audio input of the second SIP session. When the session interface of the first SIP session is in the inactivated state and the session interface of the second SIP session is in the activated state, the first electronic device controls input the audio of the user into the second SIP session, and disconnects the audio input of the first SIP session. That is, the first electronic device controls to input the audio of the user into the current active SIP session interface.

Exemplarily, the first electronic device simultaneously outputs audios of the first SIP session and the second SIP session. To ensure that the user can hear the content of the second SIP session and the content of the first SIP session, a first volume of the first SIP session is lower than a second volume of the second SIP session.

Control Method 2:

In manner 2, the first electronic device may control whether to input voice of the user of the first electronic device into the first SIP session according to an operation of the user for a voice control button on a second SIP interface. Simultaneously, the audio input of the first electronic device can also be controlled in combination with the method in the manner 1.

Exemplarily, after step 303, the session creation method provided in this embodiment of this application may further include the following step 303b1 to step 303b3.

Step 303b1. The first electronic device displays the session interface of the second SIP session, where a target control is arranged on the session interface.

Step 303b2. The first electronic device acquires the voice signal of the user.

Step 303b3. The first electronic device controls whether to input the voice signal into the first SIP session according to an enabling state of the target control.

Exemplarily, the first electronic device may acquire the voice signal of the user through a MIC. The target control may be a control with an enabling and disabling function. When the target control is in the enabling state, the first electronic device may input the acquired voice signal into the first SIP session, so that members in the first SIP session can receive the voice signal.

Exemplarily, the first electronic device receives a first input of the user for the target control on the session interface of the second SIP session. In response to the first input, the first electronic device controls to input the audio of the first electronic device into the first SIP session.

Exemplarily, the first electronic device receives a second input of the user for a voice control on the session interface of the second SIP session. In response to the second input, the first electronic device controls to stop inputting the audio of the first electronic device into the first SIP session.

Exemplarily, the first electronic device can always receive the audio output of the first SIP session.

For example, the voice control (that is, the target control) is displayed on the session interface of the second SIP session. When the user activates the control, the first electronic device may input the voice of the user into the first SIP session, so that other users in the first SIP session can hear the voice of the user of the first electronic device. When the user cancel activating the control, the first electronic device stops inputting the voice of the user into the first SIP session, so that the other users in the first SIP session cannot hear the voice of the user of the first electronic device.

It should be noted that, the above two manners for the first electronic device to control the audio input are also applicable to the third electronic device. To avoid repetition, details are not described herein again.

In this way, the first electronic device and the third electronic device can control the audio input in the first SIP session and the second SIP session through the above two manners. In this way, the content of the second SIP session is not obtained by other users in the first SIP session, and the user of the first electronic device or the third electronic device can also obtain the content of the first SIP session, for example, a notification that a moderator of the first SIP session ends group discussions.

For example, in this embodiment of this application, when the user to which the first electronic device belongs intends to disconnect the second SIP session with the user to which the third electronic device belongs, if a BYE message is sent to the third electronic device as specified in the SIP, the first SIP session between the first electronic device and the third electronic device is disconnected. Therefore, the first electronic device needs to send a request including a message to the third electronic device, to disconnect the second SIP session with the third electronic device.

Exemplarily, after step 303, the session creation method provided in this embodiment of this application may further include the following step 303c.

Step 303c. The first electronic device sends a second REFER request to the third electronic device, and disconnects the second SIP session.

The second REFER request carries second information, and the second information is used for instructing the third electronic device to disconnect the second SIP session with the first electronic device.

Exemplarily, according to a session disconnection method specified in the SIP, when the first electronic device sends the BYE message to the third electronic device, the first SIP session between the first electronic device and the third electronic device rather than the second SIP session between the first electronic device and the third electronic device is disconnected. Therefore, the first electronic device may send the second REFER request carrying the second information to the third electronic device, where the second information is used for instructing the third electronic device to disconnect the second SIP session with the first electronic device. Combined with the value of the Refer-To header field of the above first REFER request, a Refer-To header field of the second REFER request includes the URI of the third electronic device and the second information. For example, a value of the Refer-To header field of the second REFER request may be Refer-To: <sip:Bob@Bob.example; method=bye>.

In this way, when the first electronic device intends to disconnect the second SIP session with the third electronic device and does not disconnect the first SIP session between the first electronic device and the third electronic device, the first electronic device may disconnect the second SIP session with the third electronic device in a manner of sending the second REFER request carrying the second information to the third electronic device.

For example, in this embodiment of this application, referring to the SIP session creation method shown in FIG. 1, the first electronic device may create the first SIP session with the second electronic device in a manner of sending the INVITE request to the second electronic device.

Exemplarily, before step 301 of the first electronic device sending the first REFER request to the third electronic device, the session creation method provided in this embodiment of this application may further include the following step 301b1 to step 301b3.

Step 301b1. The first electronic device sends an invitation INVITE request to a target second electronic device, where the INVITE request is used for requesting to create the first SIP session with the target second electronic device.

Step 301b2. The first electronic device receives a second response message fed back by the third electronic device in response to the INVITE request.

Step 301b3. The first electronic device creates the first SIP session in a case that the second response message indicates that the target second electronic device agrees to create the first SIP session.

The target second electronic device is at least one of the N second electronic devices.

Exemplarily, the first SIP session may be created according to the SIP session creation method between the electronic devices shown in FIG. 1. The first electronic device sends the INVITE request to the second electronic device through the proxy server, and the INVITE request carries the URI of the second electronic device. After the first SIP session between the first electronic device and the second electronic device is successfully created, other users may be added to the first SIP session by using the methods described in the above manner 1 to manner 5.

In this way, the method for creating the first SIP session is different from the method for creating the second SIP session. The first SIP session is created by the first electronic device sending the INVITE request to the second electronic device. The second SIP session is created by the first electronic device sending the first REFER request to the third electronic device in a case that the first SIP session exists.

Figure 4:
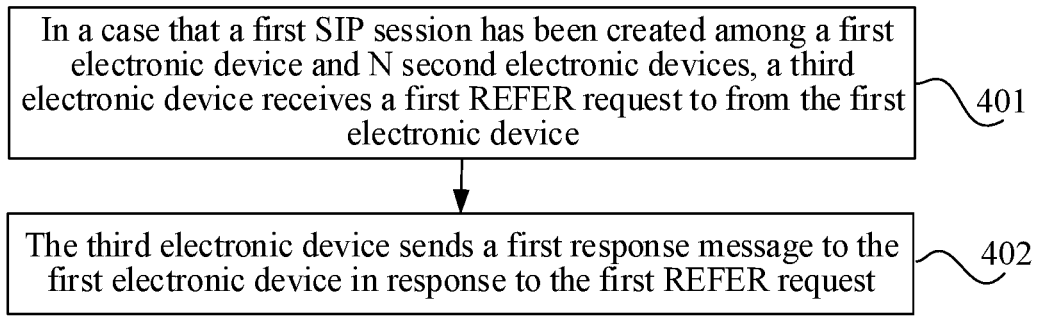
FIG. 4 is a second schematic flowchart of a session creation method according to an embodiment of this application.

This embodiment further provides another session creation method. As shown in FIG. 4, this embodiment mainly targets a second electronic device side, and the session creation method includes the following step 401 and step 402.

Step 401. In a case that a first SIP session has been created among a first electronic device and N second electronic devices, a third electronic device receives a first REFER request to from the first electronic device.

The first REFER request is used for requesting to create a second SIP session between the first electronic device and the third electronic device, and N is a positive integer.

Step 402. The third electronic device sends a first response message to the first electronic device in response to the first REFER request.

The first response message is used for indicating whether the third electronic device agrees to create the second SIP session between the first electronic device and the third electronic device.

Exemplarily, after the first REFER request sent by the first electronic device is received, the third electronic device parses the request, to obtain first information used for instructing to create the second SIP session between the third electronic device and the first electronic device. The third electronic device displays prompt information on a screen thereof, to prompt a user whether to create the second SIP session with the first electronic device, and sends the first response message to the first electronic device after determining that the user agrees. The first response message is used for indicating that the third electronic device agrees to create the second SIP session with the first electronic device. After the first response message sent by the third electronic device is received, the first electronic device successfully creates the second SIP session with the third electronic device. If a user of the third electronic device refuses the request of the first electronic device creating the second SIP session with the third electronic device, the creation of the second SIP session fails.

For example, after the first REFER request sent by the first electronic device is received, the third electronic device may determine a purpose of the first REFER request sent by the first electronic device according to information in the request.

Exemplarily, after step 401, the session creation method provided in this embodiment of this application may further include the following step 401a1 and step 401a2.

Step 401a1. The third electronic device parses the first REFER request, to obtain a target REFER parameter carried in the first REFER request.

Step 401a2. The third electronic device determines whether to create the second SIP session with the first electronic device according to the target REFER parameter.

Exemplarily, the first REFER request parsed by the third electronic device includes a value of a Refer-To header field of the first REFER request, for example, the third electronic device parses the value of the Refer-To header field, obtains first information method=invite, and determines that the first REFER request is used for instructing the third electronic device to create the second SIP session.

In this way, the third electronic device may determine that the first electronic device intends to create the second SIP session with the third electronic device according to the received first REFER request.

For example, the third electronic device controls audio inputs of the first SIP session and the second SIP session on the third electronic device according to the above two manners of controlling the audio input of the first electronic device. To avoid repetition, details are not described herein again.

For example, after the second SIP session between the third electronic device and the first electronic device is successfully created, the third electronic device may actively or passively disconnect the second SIP session with the first electronic device.

Exemplarily, after step 402, the session creation method provided in this embodiment of this application may further include the following step 402a1 to step 402a3.

Step 402a1. The third electronic device receives a second REFER request sent by the first electronic device.

Step 402a2. The third electronic device parses the second REFER request, to obtain second information carried in the second REFER request.

Step 402a3. The third electronic device disconnects the second SIP session according to the second information carried in the second REFER request.

Exemplarily, after the second REFER request sent by the first electronic device is received, the third electronic device obtains second information (that is, the above method=bye) by parsing a value of a Refer-To header field of the second REFER request), to determine that the first electronic device intends to disconnect the second SIP session with the third electronic device.

Then, the third electronic device sends a confirmation message to the first electronic device, and disconnects the second SIP session.

Exemplarily, the third electronic device may similarly send the second REFER request to the first electronic device, and actively disconnect the second SIP session with the first electronic device.

In this way, because a BYE message is not sent in the above process of disconnecting the SIP session, the third electronic device may disconnect the second SIP session with the first electronic device without disconnecting the first SIP session.

It should be noted that, the third electronic device and the first electronic device has same functions and roles in the embodiments of this application. Therefore, the third electronic device has all features of the first electronic device and can perform all steps performed by the first electronic device, and vice versa.

According to the session creation method in this embodiment of this application, in a case that a SIP session exists between a first electronic device and a third electronic device, after a first REFER request sent by the first electronic device is received, the third electronic device creates, according to first information carried in the first REFER request, a second SIP session with the first electronic device on a basis that a first SIP session exists between the first electronic device and the third electronic device, and does not disconnect the first SIP session with the first electronic device. In this way, on a premise of not disconnecting the first SIP session, the second SIP session is created, which can realize group discussions in the form of groups in a multi-person conference without affecting other members outside a group.

It should be noted that, in the session creation method provided in the embodiments of this application, an execution entity may be a session creation apparatus, or a control module configured to execute and load the session creation method in the session creation apparatus. In this embodiment of this application, an example in which the session creation apparatus executes and loads the session creation method is used to describe the session creation method provided in the embodiments of this application.

It should be noted that, in the embodiments of this application, the session creation methods shown in the accompanying drawings of the above methods are all exemplarily described with reference to an accompanying drawing in the embodiments of this application. During implementations, the session creation method shown in the accompanying drawings of the above methods may also be implemented in combination with any other accompanying drawings shown in the above embodiments that can be combined, and details are not described herein again.

Figure 5:
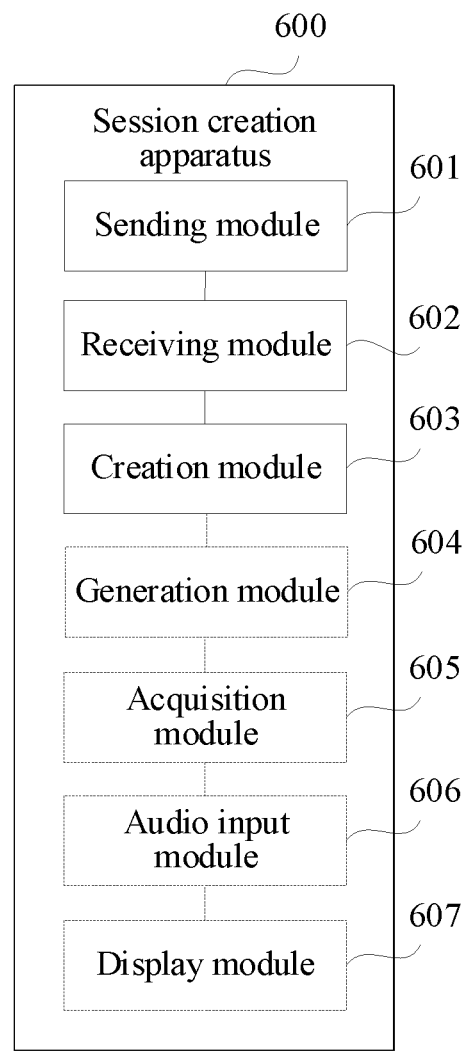
FIG. 5 is a schematic diagram of a session creation apparatus according to an embodiment of this application.

FIG. 5 is a possible schematic structural diagram of a session creation apparatus according to an embodiment of this application. As shown in FIG. 5, a session creation apparatus 600 includes: a sending module 601, a receiving module 602, and a creation module 603.

The sending module 601 is configured to send, in a case that a first session initiation protocol SIP session has been created among the first electronic device and N second electronic devices, a first reference REFER request to a third electronic device, where the first REFER request is used for requesting to create a second SIP session with the third electronic device, the third electronic device is at least one of the N second electronic devices, and N is a positive integer.

The receiving module 602 is configured to receive a first response message fed back by the third electronic device in response to the first REFER request sent by the sending module 601.

The creation module 603 is configured to create the second SIP session in a case that the first response message received by the receiving module 602 indicates that the third electronic device agrees to create the second SIP session.

For example, as shown in FIG. 5, the session creation apparatus 600 further includes: a generation module 604. The generation module 604 is configured to generate the first REFER request according to a target REFER parameter, where the target REFER parameter includes a URI of the third electronic device and first information, and the first information is used for instructing the third electronic device to create the second SIP session.

For example, the sending module 601 is further configured to send a second REFER request to the third electronic device, and disconnect the second SIP session, where the second REFER request carries second information, and the second information is used for instructing the third electronic device to disconnect the second SIP session.

For example, the sending module 601 is further configured to send an invitation INVITE request to a target second electronic device, where the INVITE request is used for requesting to create the first SIP session with the target second electronic device; the receiving module 602 is further configured to receive a second response message fed back by the third electronic device in response to the INVITE request sent by the sending module; and the creation module 603 is further configured to create the first SIP session in a case that the second response message received by the receiving module 602 indicates that the target second electronic device agrees to create the first SIP session, where the target second electronic device is at least one of the N second electronic devices.

For example, as shown in FIG. 5, the session creation apparatus 600 further includes: an acquisition module 605 and an audio input module 606. the acquisition module 605 is configured to acquire a voice signal of a user in a case that a session interface of a target SIP session is in an activated state; and the audio input module 606 is configured to input the voice signal acquired by the acquisition module 605 into the target SIP session, where the target SIP session includes the first SIP session or the second SIP session.

For example, as shown in FIG. 5, the session creation apparatus 600 further includes: a display module 607. the display module 607 is configured to display a session interface of the second SIP session, where a target control is arranged on the session interface; the acquisition module 605 is configured to acquire the voice signal of the user; and the audio input module 606 is configured to control whether to input the voice signal acquired by the acquisition module 605 into the first SIP session according to an enabling state of the target control displayed by the display module 607.

According to the session creation apparatus provided in this embodiment of this application, in a case that a SIP session exists between a first electronic device and a third electronic device, on a basis that a first SIP session exists between the first electronic device and the third electronic device, a second SIP session is created in a manner of sending a first REFER request carrying first information to the third electronic device. On a premise of not disconnecting the first SIP session, the second SIP session is created, which can realize group discussions in the form of groups in a multi-person conference without affecting other members outside a group.

It should be noted that, as shown in FIG. 5, modules that needs to be included in the session creation apparatus 600 are indicated by solid line boxes, such as the sending module 601, the receiving module 602, and the creation module 603; and modules that may be included in the session creation apparatus 600 are indicated by dashed line boxes, such as the generation module 604, the acquisition module 605, the audio input module 606, and the display module 607.

Figure 6:
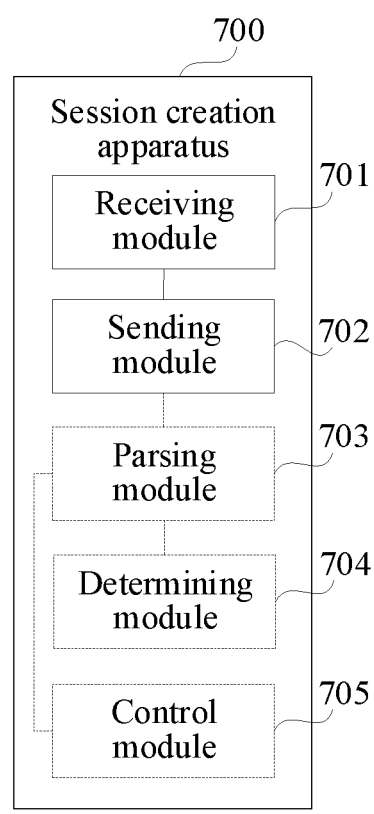
FIG. 6 is a schematic diagram of another session creation apparatus according to an embodiment of this application.

FIG. 6 is a possible schematic structural diagram of another session creation apparatus according to an embodiment of this application. As shown in FIG. 6, a session creation apparatus 700 includes: a receiving module 701 and a sending module 702.

The receiving module 701 is configured to receive, in a case that a first session initiation protocol SIP session has been created among a first electronic device and N second electronic devices, a first reference REFER request from the first electronic device, where the first REFER request is used for requesting to create a second SIP session between the first electronic device and third electronic device.

The sending module 702 is configured to send a first response message to the first electronic device in response to the first REFER request received by the receiving module 701, where the first response message is used for indicating whether the third electronic device agrees to create the second SIP session, where the third electronic device is at least one of the N second electronic devices, and N is a positive integer.

For example, as shown in FIG. 6, the session creation apparatus 700 further includes: a parsing module 703 and a determining module 704. The parsing module 703 is configured to parse the first REFER request received by the receiving module 701, to obtain a target REFER parameter carried in the first REFER request. The determining module 704 is configured to determine whether to create the second SIP session according to the target REFER parameter parsed by the parsing module 703, where the target REFER parameter includes first information, and the first information is used for instructing the third electronic device to create the second SIP session.

For example, as shown in FIG. 6, the session creation apparatus 700 further includes: a control module 705. The receiving module 701 is further configured to receive a second REFER request from the first electronic device. The parsing module 703 is configured to parse the second REFER request received by the receiving module 701, to obtain second information carried in the second REFER request. The control module 705 is configured to disconnect the second SIP session according to the second information parsed by the parsing module 703, where the second information is used for instructing the third electronic device to disconnect the second SIP session.

According to the session creation apparatus provided in this embodiment of this application, in a case that a SIP session exists between a first electronic device and a third electronic device, on a basis that a first SIP session exists between the first electronic device and the third electronic device, the third electronic device creates a second SIP session with the first electronic device in a manner of accepting a first REFER request carrying first information sent by the first electronic device. On a premise of not disconnecting the first SIP session, the second SIP session is created, which can realize group discussions in the form of groups in a multi-person conference without affecting other members outside a group.

It should be noted that, as shown in FIG. 6, modules that needs to be included in the session creation apparatus 700 are indicated by solid line boxes, such as the receiving module 701 and the sending module 702; and modules that may be included in the session creation apparatus 700 are indicated by dashed line boxes, such as the parsing module 703, the determining module 704, and the control module 705.

The session creation apparatus in this embodiment of this application may be an apparatus, or may be a component, an integrated circuit, or a chip in a terminal. The apparatus may be a mobile electronic device or a non-mobile electronic device. Exemplarily, the mobile electronic device may be a mobile phone, a tablet computer, a notebook computer, a palmtop computer, an in-vehicle electronic device, a wearable device, an Ultra-Mobile Personal Computer (UMPC), a netbook, a Personal Digital Assistant (PDA), or the like, and the non-mobile electronic device may be a server, a Network Attached Storage (NAS), a Personal Computer (PC), a television (TV), a teller machine, a self-service machine, or the like. This is not specifically limited in this embodiment of this application.

The session creation apparatus in this embodiment of this application may be an apparatus having an operating system. The operating system may be an Android operating system, may be an iOS operating system, and may also be another possible operating system. This is not specifically limited in this embodiment of this application.

The session creation apparatus provided in this embodiment of this application can implement all processes implemented by the session creation apparatuses in the method embodiments of FIG. 3 and FIG. 4. To avoid repetition, details are not described herein again.

For example, an embodiment of this application further provides an electronic device, including a processor 110, a memory 109, and a program or instruction stored on the memory 109 and executable on the processor 110. The program or instruction, when executed by the processor 110, implements all processes of the embodiments of the above session creation method, and can achieve the same technical effects. To avoid repetition, details are not described herein again.

It should be noted that, the electronic device in this embodiment of this application includes the above mobile electronic device and non-mobile electronic device.

Figure 7:
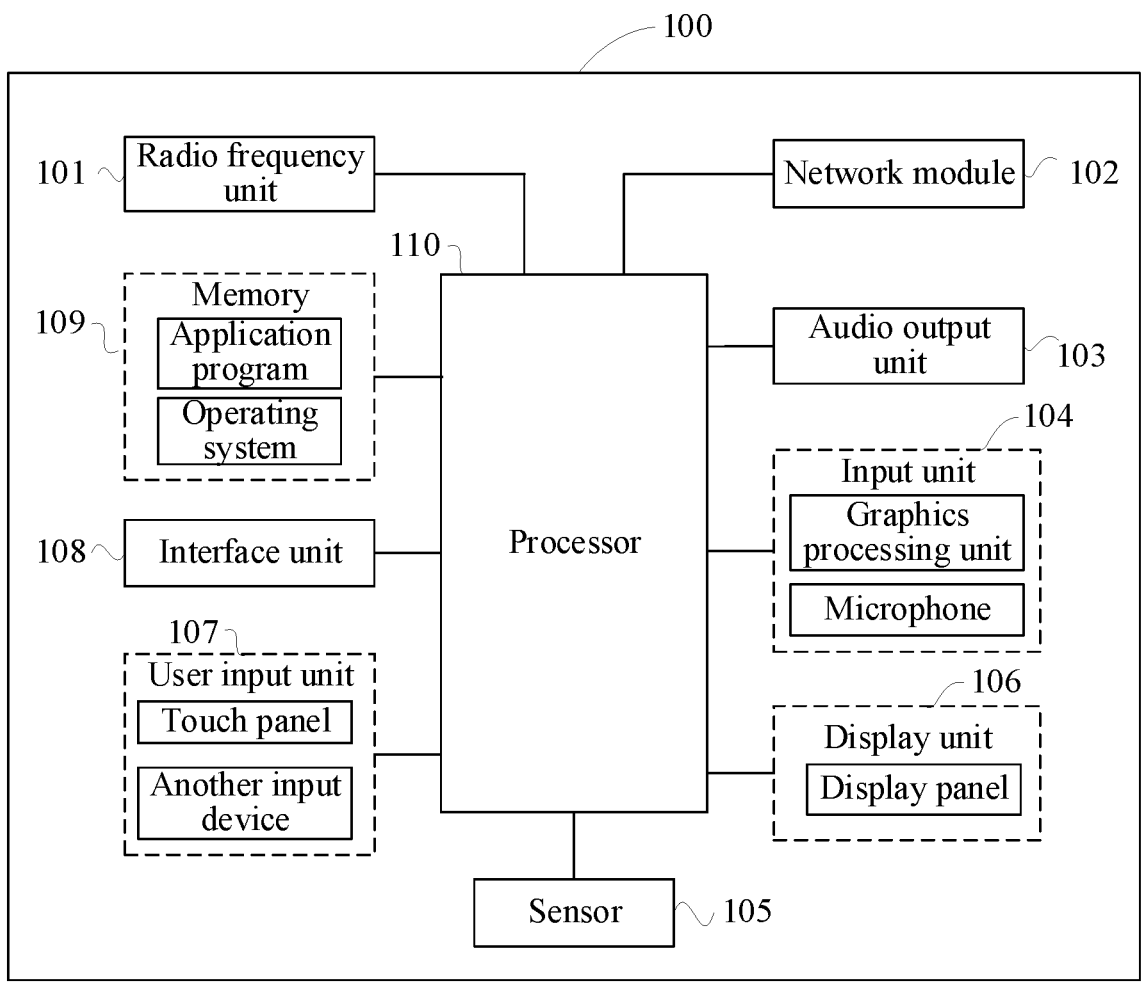
FIG. 7 is a schematic structural diagram of an electronic device according to an embodiment of this application.

FIG. 7 is a schematic diagram of a hardware structure of an electronic device that implements the embodiments of this application.

An electronic device 100 includes, but is not limited to, components such as a radio frequency unit 101, a network module 102, an audio output unit 103, an input unit 104, a sensor 105, a display unit 106, a user input unit 107, an interface unit 108, a memory 109, and a processor 110.

A person skilled in the art may understand that the electronic device 100 further includes a power supply (such as a battery) for supplying power to the components. The power supply may logically connect to the processor 110 by using a power supply management system, thereby implementing functions, such as charging, discharging, and power consumption management, by using the power supply management system. The structure of the electronic device shown in FIG. 7 constitutes no limitation on the electronic device, and the electronic device may include more or fewer components than those shown in the figure, or some components may be combined, or a different component deployment may be used. Details are not described herein again.

When the electronic device 100 is a first electronic device, the radio frequency unit 101 is configured to send, in a case that a first session initiation protocol SIP session has been created among the first electronic device and N second electronic devices, a first reference REFER request to a third electronic device.

The frequency unit 101 is further configured to receive a first response message fed back by the third electronic device in response to the first REFER request.

The processor 110 is configured to create the second SIP session in a case that the first response message received by the radio frequency unit 101 indicates that the third electronic device agrees to create the second SIP session.

In this way, in a case that a first SIP session exists between a first electronic device and a second electronic device, the first electronic device request, to create a second SIP session with the second electronic device in a manner of sending a first REFER request to the second electronic device, and creates the second SIP session with the second electronic device after receiving a first response message sent by the second electronic device. The first electronic device may create a new teleconference with the second electronic device on a basis that the first electronic device has created a teleconference with the second electronic device.

For example, the processor 110 is further configured to generate the REFER request according to a target REFER parameter, where the target REFER parameter includes a URI of the third electronic device and first information, and the first information is used for instructing the third electronic device to create the second SIP session.

In this way, the first electronic device can send the first REFER request including the target parameter to the third electronic device according to the URI of the third electronic device. After the first REFER request is received, the third electronic device can determine that the first electronic device intends to create the SIP session with the third electronic device according to the first information in the Refer-To header field of the first REFER request. Then, the third electronic device can create the second SIP session with the first electronic device according to the first information.

For example, the radio frequency unit 101 is further configured to send a second REFER request to the third electronic device, and disconnect the second SIP session, where the second REFER request carries second information, and the second information is used for instructing the third electronic device to disconnect the second SIP session.

In this way, when the first electronic device intends to disconnect the second SIP session with the third electronic device and does not disconnect the first SIP session between the first electronic device and the third electronic device, the first electronic device may disconnect the second SIP session with the third electronic device in a manner of sending the second REFER request carrying the second information to the third electronic device.

For example, the radio frequency unit 101 is further configured to send an invitation INVITE request to a target second electronic device, where the INVITE request is used for requesting to create the first SIP session with the target second electronic device; the radio frequency unit 101 is further configured to receive a second response message fed back by the third electronic device in response to the INVITE request; and the processor 110 is further configured to create the first SIP session in a case that the second response message indicates that the target second electronic device agrees to create the first SIP session, where the target second electronic device is at least one of the N second electronic devices.

In this way, the method for creating the first SIP session is different from the method for creating the second SIP session. The first SIP session is created by the first electronic device sending the INVITE request to the second electronic device. The second SIP session is created by the first electronic device sending the first REFER request to the third electronic device in a case that the first SIP session exists.

For example, the input unit 104 is configured to acquire a voice signal of a user in a case that a session interface of a target SIP session is in an activated state; and the processor 110 is configured to input the voice signal acquired by the input unit 104 into the target SIP session.

For example, the display unit 106 is configured to display a session interface of the second SIP session, where a target control is arranged on the session interface; the input unit 104 is configured to acquire the voice signal of the user; and the processor 110 is configured to control whether to input the voice signal acquired by the input unit 104 into the first SIP session according to an enabling state of the target control.

In this way, the first electronic device and the third electronic device can control the audio input in the first SIP session and the second SIP session through the above two manners. In this way, the content of the second SIP session is not obtained by other users in the first SIP session, and the user of the first electronic device or the third electronic device can also obtain the content of the first SIP session, for example, a notification that a moderator of the first SIP session ends group discussions.

When the electronic device 100 is a second electronic device, the radio frequency unit 101 is configured to receive, in a case that a first session initiation protocol SIP session has been created among a first electronic device and N second electronic devices, a first reference REFER request from the first electronic device, where the first REFER request is used for requesting to create a second SIP session between the first electronic device and a third electronic device.

The radio frequency unit 101 is configured to send a first response message to the first electronic device in response to the first REFER request, where the first response message is used for indicating whether the third electronic device agrees to create the second SIP session, where the third electronic device is at least one of the N second electronic devices.

For example, the processor 110 is configured to parse the first REFER request, to obtain a target REFER parameter carried in the first REFER request; and the processor 110 is configured to determine whether to create the second SIP session according to the parsed target REFER parameter, where the target REFER parameter includes first information, and the first information is used for instructing the third electronic device to create the second SIP session.

For example, the radio frequency unit 101 is further configured to receive a second REFER request sent by the first electronic device; and the processor 110 is further configured to parse the second REFER request received by the radio frequency unit 101, to obtain second information carried in the second REFER request; and disconnect the second SIP session according to the second information carried in the second REFER request.

According to the electronic device provided in this embodiment of this application, in a case that a SIP session exists between a first electronic device and a third electronic device, on a basis that a first SIP session exists between the first electronic device and the third electronic device, a second SIP session is created in a manner of sending a first REFER request carrying first information to the third electronic device. On a premise of not disconnecting the first SIP session, the second SIP session is created, which can realize group discussions in the form of groups in a multi-person conference without affecting other members outside a group.

An embodiment of this application further provides a readable storage medium, storing a program or instruction. The program or instruction, when executed by a processor, implements all processes of the embodiments of the above session creation method, and can achieve the same technical effects. To avoid repetition, details are not described herein again.

The processor is the processor in the above electronic device in the foregoing embodiments. The readable storage medium includes a computer-readable storage medium, for example, a computer Read-Only Memory (ROM), a Random Access Memory (RAM), a magnetic disk, or an optical disc.

An embodiment of this application further provides a chip, including: a processor and a communication interface, where the communication interface is coupled to the processor, and the processor is configured to run a program or instruction, to implement all processes of the embodiments of the above session creation method, and can achieve the same technical effects. To avoid repetition, details are not described herein again.

It should be understood that, the chip mentioned in this embodiment of this application may also be referred to as a system-level chip, a system chip, a chip system, a system on chip, or the like.

It should be noted that, the term "comprise", "include" or any other variation thereof in this specification is intended to cover a non-exclusive inclusion, which specifies the presence of stated processes, methods, objects, or apparatuses, but does not preclude the presence or addition of one or more other processes, methods, objects, or apparatuses. Without more limitations, elements defined by the sentence "including one . . . " does not exclude that there are still other same elements in the processes, methods, objects, or apparatuses. In addition, it should be noted that the scope of the methods and apparatuses in the implementations of this application is not limited to performing the functions in the order shown or discussed, but may also include performing, according to involved functions, the functions basically simultaneously or in a reverse order. For example, the described methods may be performed in an order different from that described, and various steps may also be added, omitted, or combined. In addition, features described with reference to some examples may be combined in other examples.

Through the descriptions of the foregoing implementations, a person skilled in the art may clearly understand that the method according to the foregoing embodiments may be implemented by means of software and a necessary general hardware platform, and may be implemented by hardware. In some embodiments, the technical solutions in this application essentially or the part contributing to the existing technologies may be implemented in the form of a software product. The computer software product is stored in a storage medium (for example, an ROM/RAM, a magnetic disk or an optical disc), and includes several instructions for instructing an electronic device (which may be a mobile phone, a computer, a server, an air conditioner, a network device, or the like) to perform the method described in the embodiments of this application.

The embodiments of this application are described above with reference to the accompanying drawings. However, this application is not limited to the foregoing implementations. The foregoing implementations are illustrative instead of limitative. Enlightened by this application, a person of ordinary skill in the art can make many forms without departing from the idea of this application and the scope of protection of the claims. All of the forms fall within the protection of this application.

What is claimed is:

1. A session creation method, performed by a first electronic device, comprising:
   while the first electronic device and N second electronic devices are participating in a first Session Initiation Protocol (SIP) session, sending a first reference (REFER) request by the first electronic device to a third electronic device, wherein the first REFER request is used for requesting to create a second SIP session, which is separate and distinct from the first SIP session, between the first electronic device and the third electronic device, wherein the third electronic device is among the N second electronic devices participating in the first SIP session with the first electronic device and N is a positive integer that is greater than 1;
   receiving, by the first electronic device, a first response message fed back by the third electronic device in response to the first REFER request; and
   creating, by the first electronic device, the second SIP session when the first response message indicates that the third electronic device agrees to create the second SIP session, wherein
   after creating the second SIP session, the first electronic device and the third electronic device are simultaneously participating both the first and second SIP sessions, so that the first electronic device outputs an audio signal to both the first and second SIP sessions simultaneously.

2. The session creation method according to claim 1, wherein before the sending a first REFER request to a third electronic device, the method further comprises:
   generating the first REFER request according to a target REFER parameter, wherein
   the target REFER parameter comprises a Uniform Resource Identifier (URI) of the third electronic device and first information, and the first information is used for instructing the third electronic device to create the second SIP session.

3. The session creation method according to claim 1, wherein after the receiving a response message fed back by the third electronic device in response to the first REFER request, the method further comprises:
   sending a second REFER request to the third electronic device, and disconnecting the second SIP session, wherein
   the second REFER request carries second information, and the second information is used for instructing the third electronic device to disconnect the second SIP session.

4. The session creation method according to claim 1, wherein before the sending a first REFER request to a third electronic device, the method further comprises:
   sending an invitation (INVITE) request to a target second electronic device, wherein the INVITE request is used for requesting to create the first SIP session with the target second electronic device;
   receiving a second response message fed back by the third electronic device in response to the INVITE request; and
   creating the first SIP session in a case that the second response message indicates that the target second electronic device agrees to create the first SIP session, wherein
   the target second electronic device is at least one of the N second electronic devices.

5. The session creation method according to claim 1, wherein after the creating the second SIP session, the method further comprises:
   acquiring a voice signal of a user in a case that a session interface of a target SIP session is in an activated state; and
   inputting the voice signal into the target SIP session, wherein
   the target SIP session comprises the first SIP session or the second SIP session.

6. The session creation method according to claim 1, wherein after the creating the second SIP session, the method further comprises:
   displaying a session interface of the second SIP session, wherein a target control is arranged on the session interface;
   acquiring a voice signal of the user; and
   controlling whether to input the voice signal into the first SIP session according to an enabling state of the target control.

7. A session creation method, performed by a third electronic device, comprising:
   while a first electronic device and N second electronic devices are participating in a first Session Initiation Protocol (SIP) session, receiving a first reference (REFER) request by the third electronic device from the first electronic device, wherein the first REFER request is used for requesting to create a second SIP session, which is separate and distinct from the first SIP session, between the first electronic device and the third electronic device, wherein the third electronic device is among the N second electronic devices participating in the first SIP session with the first electronic device, and N is a positive integer that is greater than 1; and
   sending, by the third electronic device, a first response message to the first electronic device in response to the first REFER request, wherein the first response message is used for indicating whether the third electronic device agrees to create the second SIP session, wherein
   after the second SIP session is created, the first electronic device and the third electronic device are simultaneously participating both the first and second SIP sessions, so that the first electronic device outputs an audio signal to both the first and second SIP sessions simultaneously.

8. The session creation method according to claim 7, wherein after the receiving a first REFER request from the first electronic device, the method further comprises:
   parsing the first REFER request, to obtain a target REFER parameter carried in the first REFER request; and
   determining whether to create the second SIP session according to the target REFER parameter, wherein the target REFER parameter comprises first information, and the first information is used for instructing the third electronic device to create the second SIP session.

9. The session creation method according to claim 7, wherein after the sending a first response message to the first electronic device, the method further comprises:
receiving a second REFER request sent by the first electronic device;
parsing the second REFER request, to obtain second information carried in the second REFER request; and
disconnecting the second SIP session according to the second information, wherein
the second information is used for instructing the third electronic device to disconnect the second SIP session.

10. A first electronic device comprising: a memory having a computer program stored thereon; and a processor, wherein the computer program, when executed by the processor, causes the processor to perform a session creation method, comprising:
while a first electronic device and N second electronic devices are participating in a first Session Initiation Protocol (SIP) session, sending a first reference (REFER) request by the first electronic device to a third electronic device, wherein the first REFER request is used for requesting to create a second SIP session, which is separate and distinct from the first SIP session, between the first electronic device and the third electronic device, wherein the third electronic device is among the N second electronic devices participating in the first SIP session with the first electronic device and N is a positive integer that is greater than 1;
receiving, by the first electronic device, a first response message fed back by the third electronic device in response to the first REFER request; and
creating, by the first electronic device, the second SIP session when the first response message received that the third electronic device agrees to create the second SIP session, wherein
after creating the second SIP session, the first electronic device and the third electronic device are simultaneously participating both the first and second SIP sessions, so that the first electronic device outputs an audio signal to both the first and second SIP sessions simultaneously.

11. The first electronic device according to claim 10, wherein the method further comprises: generating the first REFER request according to a target REFER parameter, wherein the target REFER parameter comprises a Uniform Resource Identifier (URI) of the third electronic device and first information, and the first information is used for instructing the third electronic device to create the second SIP session.

12. The first electronic device according to claim 10, wherein after the receiving a response message fed back by the third electronic device in response to the first REFER request, the method further comprises: sending a second REFER request to the third electronic device, and disconnecting the second SIP session, wherein the second REFER request carries second information, and the second information is used for instructing the third electronic device to disconnect the second SIP session.

13. The first electronic device according to claim 10, wherein before the sending a first REFER request to a third electronic device, the method further comprises: sending an invitation (INVITE) request to a target second electronic device, wherein the INVITE request is used for requesting to create the first SIP session with the target second electronic device; receiving a second response message fed back by the third electronic device in response to the INVITE request; and creating the first SIP session in a case that the second response message indicates that the target second electronic device agrees to create the first SIP session, wherein the target second electronic device is at least one of the N second electronic devices.

14. The first electronic device according to claim 10, wherein after the creating the second SIP session, the method further comprises: acquiring a voice signal of a user in a case that a session interface of a target SIP session is in an activated state; and inputting the voice signal into the target SIP session, wherein the target SIP session comprises the first SIP session or the second SIP session.

15. The first electronic device according to claim 10, wherein after the creating the second SIP session, the method further comprises: displaying a session interface of the second SIP session, wherein a target control is arranged on the session interface; acquiring the voice signal of the user; and controlling whether to input the voice signal into the first SIP session according to an enabling state of the target control.

* * * * *